United States Patent [19]

Sakurai

[11] Patent Number: 5,126,904
[45] Date of Patent: Jun. 30, 1992

[54] MAGNETIC HEAD SUPPORTING STRUCTURE WITH THICK AND THIN PORTIONS FOR AN INFORMATION RECORDING APPARATUS

[76] Inventor: Yutaka Sakurai, 3-2337-3, Kawasaki, Nagaoka-shi, Niigata-Ken, Japan

[21] Appl. No.: 616,137

[22] Filed: Nov. 20, 1990

[30] Foreign Application Priority Data

Dec. 7, 1989 [JP] Japan .................. 1-141967[U]

[51] Int. Cl.⁵ .................. G11B 5/48; G11B 21/16
[52] U.S. Cl. .................. 360/104; 360/103; 360/106
[58] Field of Search ............ 360/106, 104, 103, 107

[56] References Cited

U.S. PATENT DOCUMENTS

| 4,352,133 | 9/1982 | Hager | 360/103 |
| 4,760,478 | 7/1988 | Pal | 360/104 |
| 4,821,130 | 4/1989 | Bernett et al. | 360/106 |
| 4,884,154 | 11/1989 | Onodera | 360/104 |

FOREIGN PATENT DOCUMENTS

| 63-234470 | 9/1988 | Japan | 360/104 |
| 63-261584 | 10/1988 | Japan | 360/104 |
| 1173377 | 7/1989 | Japan | 360/104 |

Primary Examiner—Aristotelis Psitos
Assistant Examiner—Alfonso Garcia

[57] ABSTRACT

Disclosed is a magnetic head supporting structure of the type which is in the form of a supporting plate or load beam and which supports a magnetic head at its free end. This magnetic head supporting structure comprises a flat section which includes thick-walled portions and thin-walled portions so as to form a pattern thereon.

10 Claims, 3 Drawing Sheets

MAGNETIC HEAD SUPPORTING STRUCTURE WITH THICK AND THIN PORTIONS FOR AN INFORMATION RECORDING APPARATUS

BACKGROUND OF THE INVENTION

1. Field of the Invention

This invention relates to a supporting structure for a magnetic head.

2. Description of the Related Art

Conventionally, a cantilever-type flat supporting member has been widely used as the supporting structure for a magnetic head. FIG. 4 is a perspective view of such a conventional supporting structure, which consists of a load beam 1 in the form of a flat supporting plate, to the free end of which is attached a magnetic head 5 through the intermediation of a gimbal spring (not shown). Attached to the other end of the load beam 1 is a mounting plate 4. As shown in FIG. 4, the side edges of the load beam 1 are bent as indicated at 1c, 1c, the load beam 1 generally exhibiting an isosceles-triangle-like configuration. The side edges of that portion 1d of the load beam 1 which corresponds to the base of this isosceles triangle are not bent. That portion of the load beam 1 which is equipped with the bent side edges 1c, 1c exhibits a high rigidity, so that the elasticity of the load beam 1 is concentrated on the portion 1d having no bent side edges. Because of this construction, the bent side edges 1c, 1c of the load beam 1 provides the requisite rigidity for allowing the load beam to follow any undulation of an associated magnetic recording medium.

Information recording apparatuses today are required to be smaller in size and higher in speed. In this context, any unnecessary vibration of the supporting structure for a magnetic head is undesirable since it will adversely affect the operation of the associated information recording apparatus. For example, such a vibration may cause the magnetic head to strike against the magnetic disc. When performing a seeking operation at high speed, in particular, a vibration from outside inevitably occurs and the head section is swung in the seeking direction, with the result that a vibration in a torsional mode is generated in the flat head supporting member. In an experiment, mechanical vibrations of various frequencies were applied to magnetic head supporting structures to examine how the amplitude of the magnetic head changes in response to these vibrations. FIG. 2 shows the results of this experiment. The solid line represents the frequency response characteristic of a conventional head supporting structure. In FIG. 2, the amplitude peaks at frequencies of around 2KHz and 3KHz indicate vibrations in a torsional mode. FIGS. 5(a) and 5(b) show how such torsional mode vibrations occur to the load beam 1. FIG. 5(a) shows a vibration mode at a frequency of around 2KHz. In this case, the entire flat portion of the load beam 1 is twisted except for the mounting plate 4. FIG. 5(b) shows a vibration mode at a frequency of around 3KHz. In this case, only that portion of the load beam 1 which corresponds to the base of the isosceles triangle is twisted. Thus, at frequencies of around 2KHz and 3KHz, the load beam 1 suffers torsion, which means the magnetic head cannot take an ideal posture at these frequencies. This frequency response characteristic of the magnetic head makes it difficult to design the associated servo system in such a way that it works properly while the magnetic disc drive device is in operation. Further, if there is a dispersion in the production of the load beam 1, the frequency of its vibration may fluctuate to an excessively large degree, resulting in a deviation from the setting of the compensation circuit in the servo system. In the worst case, the servo system may malfunction, resulting in a seeking error. The amplitude might be diminished by augmenting the thickness of the load beam. That, however, will also heighten the rigidity in the bending direction of the beam, thereby making it difficult for the head to follow the undulation of the magnetic recording medium.

SUMMARY OF THE INVENTION

This invention has been made in view of the above problems. It is accordingly an object of this invention to provide a magnetic head supporting structure in the form of a flat supporting plate which exhibits high rigidity in the torsional direction thereof and which maintains the same level of elasticity in the bending direction thereof as that of conventional head supporting plates.

In accordance with this invention, there is provided a magnetic head supporting structure of the type which is in the form of a supporting plate and which supports a magnetic head at its free end, the magnetic head supporting structure comprising a flat section which includes thick-walled portions and thin-walled portions.

The thick-walled portions 1b of the flat supporting plate 1 help to enhance the rigidity of the plate and renders it resistant to vibrations in a torsional mode, whereas the thin-walled portions 1a help to maintain the requisite elasticity of the flat supporting plate 1 to enable the magnetic head 5 to follow the movement of the magnetic recording medium (not shown) with ease.

DETAILED DESCRIPTION OF THE PREFERRED EMBODIMENTS

Figure 1:
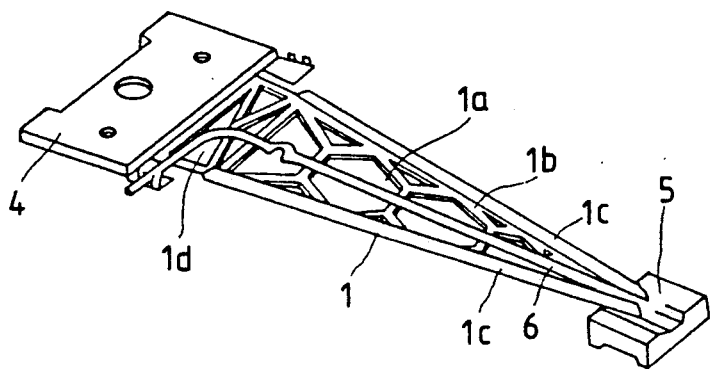
FIG. 1 is a perspective view of a magnetic head supporting structure comprising a flat supporting member in accordance with this invention.
Figure 3A:
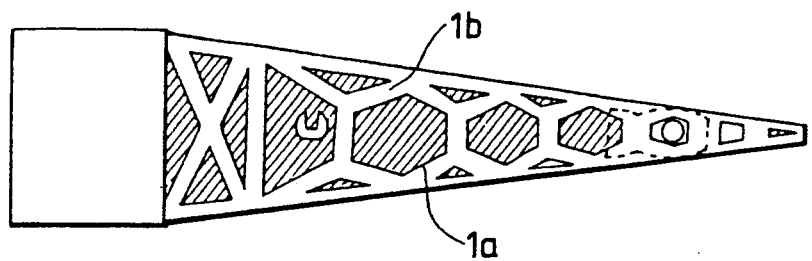
FIGS. 3(a), 3(b) and 3(c) are plan views of flat supporting members in accordance with this invention.
Figure 3B:
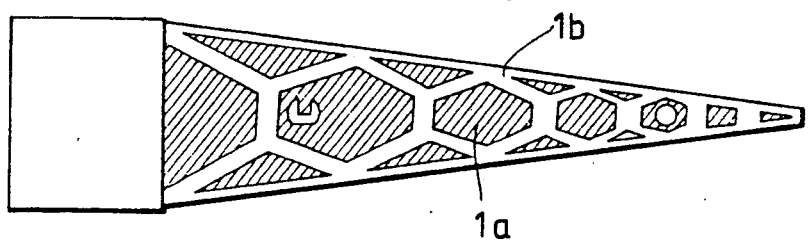
Figure 3C:
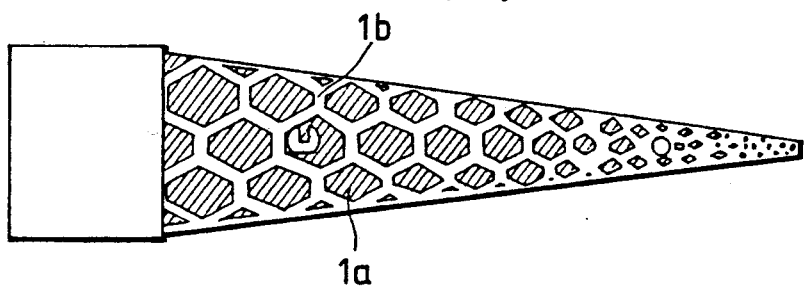
Figure 4:
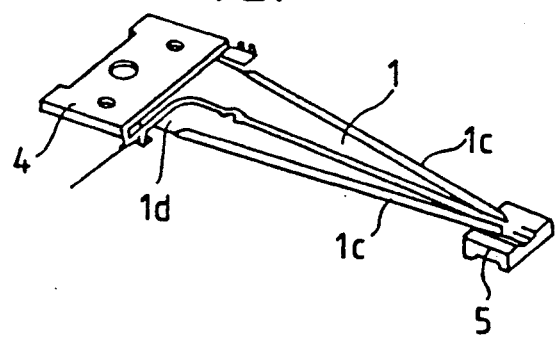
FIG. 4 is a perspective view of a conventional magnetic head supporting structure.
Figure 5A:
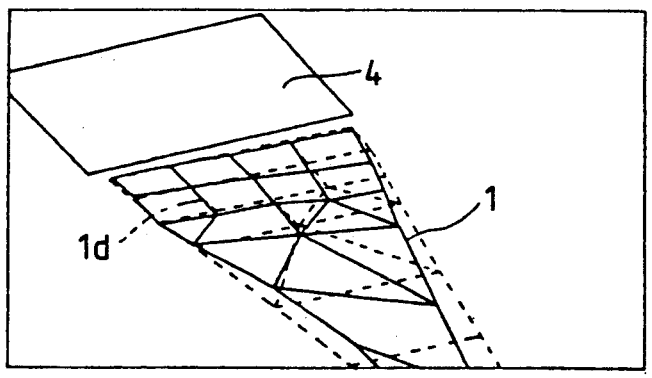
FIGS. 5(a) and 5(b) are diagrams showing manners of vibration in the conventional supporting structure.
Figure 5B:
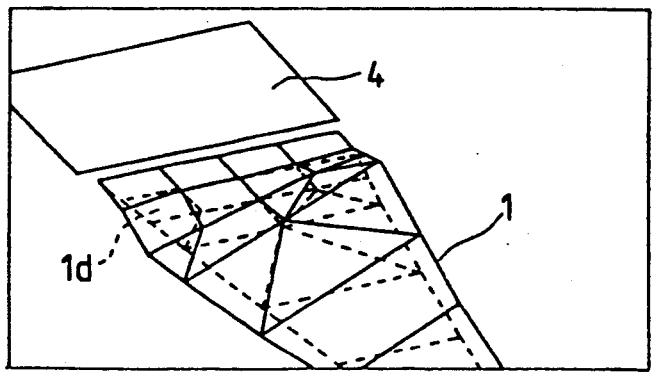

An embodiment of this invention will now be described with reference to the accompanying drawings. FIG. 1 shows a magnetic head supporting structure in accordance with a first embodiment of this invention, which comprises a load beam 1 consisting of a flat supporting member having on its surface thick-walled portions 1b and thin-walled portions 1a. A floating magnetic head 5 is attached to the free end of this load beam 1 through the intermediation of a gimbal spring (not shown). The side edges of this load beam 1 are bent. The side edges of that section 1d of the load beam 1 which corresponds to the base of the isosceles triangle are not bent. Further, a mounting plate 4 is attached to the other end of the load beam 1. The thickness of the load beam 1 is somewhat larger than in the prior art. Thin-walled portions 1a are formed on the flat section of the load beam 1 by etching or the like. FIGS. 3(a) to 3(b) show examples of the pattern formed on the flat section of the load beam 1. Though its rigidity in general is the same as in the prior art, this load beam 1 provides a higher torsional rigidity. FIG. 3(b) shows a second embodiment of this invention. In this embodiment, a row of tortoiseback-like, or hexagonal-shaped, pattern extends over the entire length of the beam, whereas, in the first embodiment, shown in FIG. 3(a), such a pattern is not formed on the section 1d corresponding to the base of the isosceles triangle. FIG. 3(c) shows a third embodiment of this invention. In this embodiment a plurality of rows of tortoiseback-like, or hexagonal-shaped, patterns are formed all over the surface of the load beam. Like the first embodiment, these second and third embodiments make it possible to shift the vibration peak to the high-frequency side.

Figure 2:
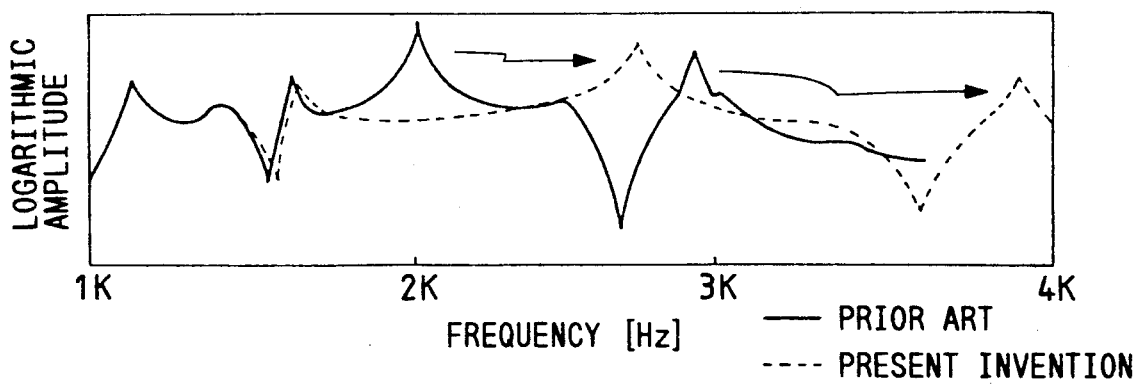
FIG. 2 is a chart showing the respective frequency response characteristics of a conventional magnetic head supporting structure and a magnetic head supporting structure in accordance with this invention.

In the first embodiment, shown in FIG. 3(a), the flat section of the load beam 1 exhibits a combination pattern composed of a tortoiseback-like pattern and a cross-line pattern, both being formed by etching or the like. That portion of the flat section whose side edges are bent exhibits a tortoiseback-like, or hexagonal-shaped, pattern, whereas the section 1d which corresponds to the base of the isosceles triangle exhibits a cross-line pattern. As indicated by the broken line of FIG. 2, the frequency response characteristic of the load beam of the first embodiment is such that the vibration peak is shifted to the high-frequency side as compared to that of the conventional load beam. Thus, by forming a relief tortoiseback-like pattern on the flat section of the load beam 1 by etching or the like, a load beam which is light in weight and which offers high rigidity against a torsional mode vibration can be provided. Further, in this embodiment, that section 1d which corresponds to the base of the isosceles triangle allows forming of a relief pattern thereon. By forming this relief pattern as a cross-line pattern, the torsional rigidity of the load beam can be enhanced while maintaining the same bending rigidity as in the prior art.

Thus, in accordance with this invention, thick-walled portions and thin-walled portions are formed on the flat section of the flat supporting plate, thereby making it possible to enhance the torsional rigidity of the plate. This structure is effective in protecting the plate from a torsional-mode vibration which is to be observed when the vibration amplitude is at its peak. Further, the presence of the thin-walled portions allows the elasticity in the bending direction of the plate to be maintained on the same level as in the prior art.

What is claimed is:

1. A magnetic head supporting structure comprising:
   a mounting plate;
   a magnetic head; and
   a flat plate member disposed substantially in a plane, said flat plate member being connected to said mounting plate and to said magnetic head, said flat plate member having an outer periphery in said plane defining an area in said plane, said flat plate member comprising:
   a plurality of first regions, each of said plurality of first regions having a first thickness; and
   an interconnected lattice structure having a second thickness which is greater than said first thickness, said lattice structure surrounding at least some of said plurality of first regions, said plurality of first regions and said lattice structure being formed so that all said area of said flat plate member in said plane has at least said first thickness.

2. The magnetic head supporting structure of claim 1, wherein said lattice structure of said flat plate member forms a lattice with a tortoiseback-like structure.

3. The magnetic head supporting structure of claim 1, wherein said lattice structure of said flat plate member forms a lattice of hexagonal structures.

4. The magnetic head supporting structure of claim 1, wherein said lattice structure of said flat plate member forms a lattice of cross-line patterned structures.

5. The magnetic head supporting structure of claim 1, wherein said plurality of first regions are etched regions in said flat plate member.

6. The magnetic head supporting structure of any of claims 1–5, further comprising:
   outer load beam members, each outer load beam member being connected to said mounting plate and to said magnetic head, each of said outer load beam members lying in said plane, said flat plate member being disposed at least partially between said outer load beam members.

7. The magnetic head supporting structure of claim 1, wherein said outer periphery of said flat plate member has a substantially triangular shape.

8. The magnetic head supporting structure of claim 1, wherein a first portion of the lattice structure forms a lattice of hexagonal structures, and wherein a second portion of the lattice structure forms at least one cross-line shaped structure.

9. The magnetic head supporting structure of claim 8, wherein said outer periphery of said flat plate member has a substantially isosceles triangle shape, and wherein said first portion of the lattice structure is a base portion of said substantially isosceles triangle shape.

10. A magnetic head supporting structure comprising:
    a mounting plate;
    a magnetic head;
    a flat plate member disposed substantially in a plane, said flat plate member being connected to said mounting plate and to said magnetic head, said flat plate member having an outer periphery in said plane defining an area in said plane, said flat plate member comprising:
    a plurality of first regions, each of said plurality of first regions having a first thickness; and
    an interconnected lattice structure having a second thickness which is greater than said first thickness, said lattice structure surrounding at least some of said plurality of first regions, said plurality of first regions and said lattice structure being formed so that substantially all said area of said flat plate member in said plane has at least said first thickness; and
    outer load beam members, each outer load beam member being connected to said mounting plate and to said magnetic head, each of said outer load beam members lying in said plane, said flat plate member being disposed at least partially between said outer load beam members, wherein a first portion of each of said outer load beam members is disposed in said plane and a second portion of each of said outer load beam members is disposed in another plane.

* * * * *

UNITED STATES PATENT AND TRADEMARK OFFICE
CERTIFICATE OF CORRECTION

PATENT NO. : 5,126,904
DATED : June 30, 1992
INVENTOR(S) : Yutaka Sakurai

It is certified that error appears in the above-indentified patent and that said Letters Patent is hereby corrected as shown below:

On the title page: Item [73] Assignee:
"Alps Electric Co., Ltd., Japan".

Signed and Sealed this

Third Day of May, 1994

Attest:

BRUCE LEHMAN

Attesting Officer

Commissioner of Patents and Trademarks